United States Patent [19]

Mihara

[11] 4,354,743
[45] Oct. 19, 1982

[54] ATTACHMENT LENS SYSTEM
[75] Inventor: Shin'ichi Mihara, Hachioji, Japan
[73] Assignee: Olympus Optical Co., Ltd., Tokyo, Japan
[21] Appl. No.: 187,449
[22] Filed: Sep. 15, 1980
[30] Foreign Application Priority Data
Sep. 18, 1979 [JP] Japan .................................. 54/119831
[51] Int. Cl.³ .......................... G02B 9/62; G02B 11/32
[52] U.S. Cl. .................................................. 350/464
[58] Field of Search ....................... 350/422, 463, 464
[56] References Cited
FOREIGN PATENT DOCUMENTS
52-109930 9/1977 Japan .
52-146621 12/1977 Japan .

Primary Examiner—John K. Corbin
Assistant Examiner—Rebecca D. Gass
Attorney, Agent, or Firm—Cushman, Darby & Cushman

[57] ABSTRACT

An attachment lens system having favorably corrected various aberrations, especially curvature of field, comprising a front lens group and a rear lens group: said first lens group consisting of a negative meniscus lens component, a second biconvex lens component and a third biconcave lens component, and said rear lens group consisting of a fourth biconvex lens component, a fifth positive meniscus lens component and a sixth biconcave lens component.

8 Claims, 9 Drawing Figures

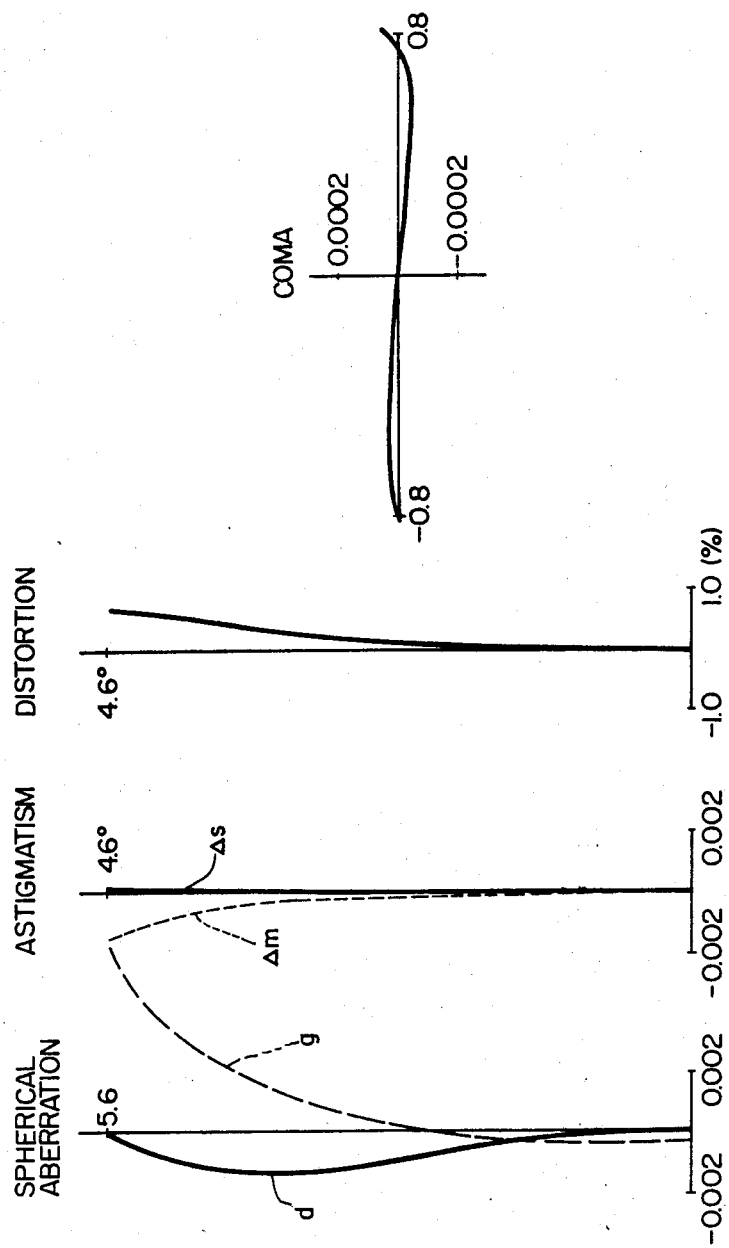

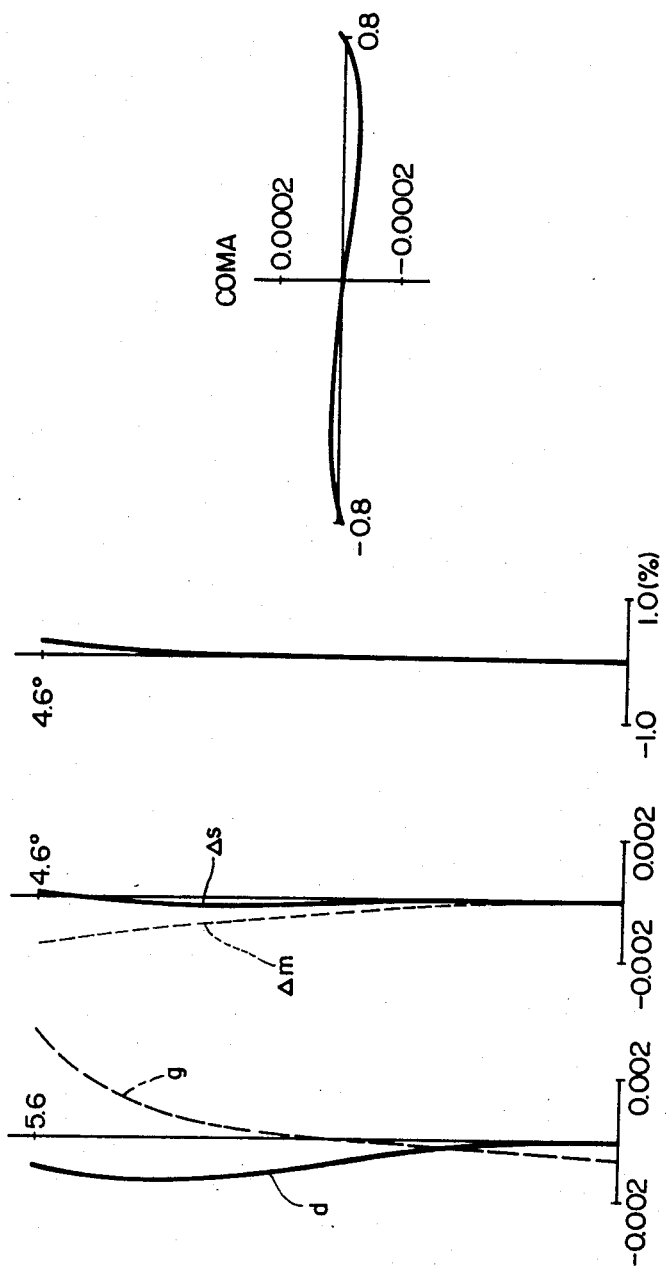

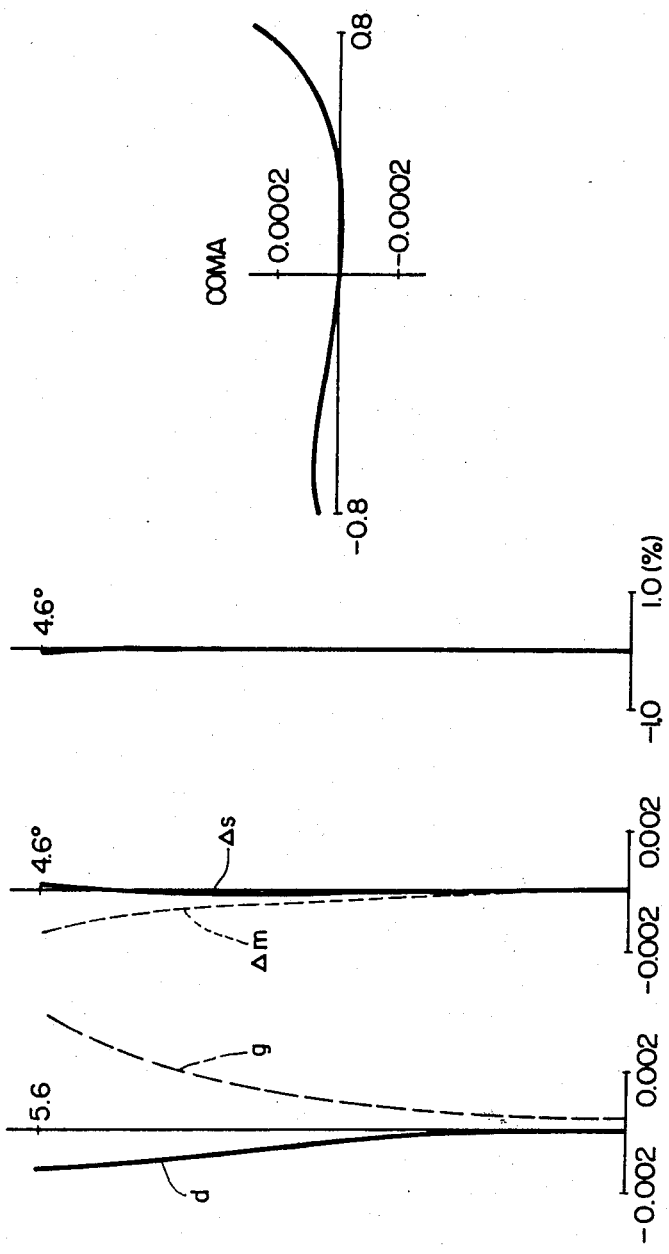

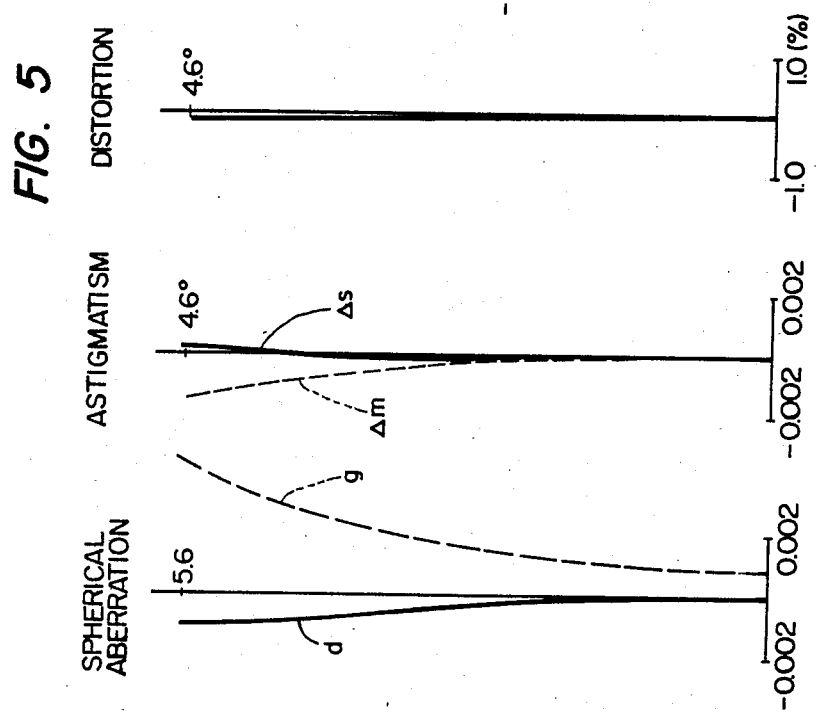

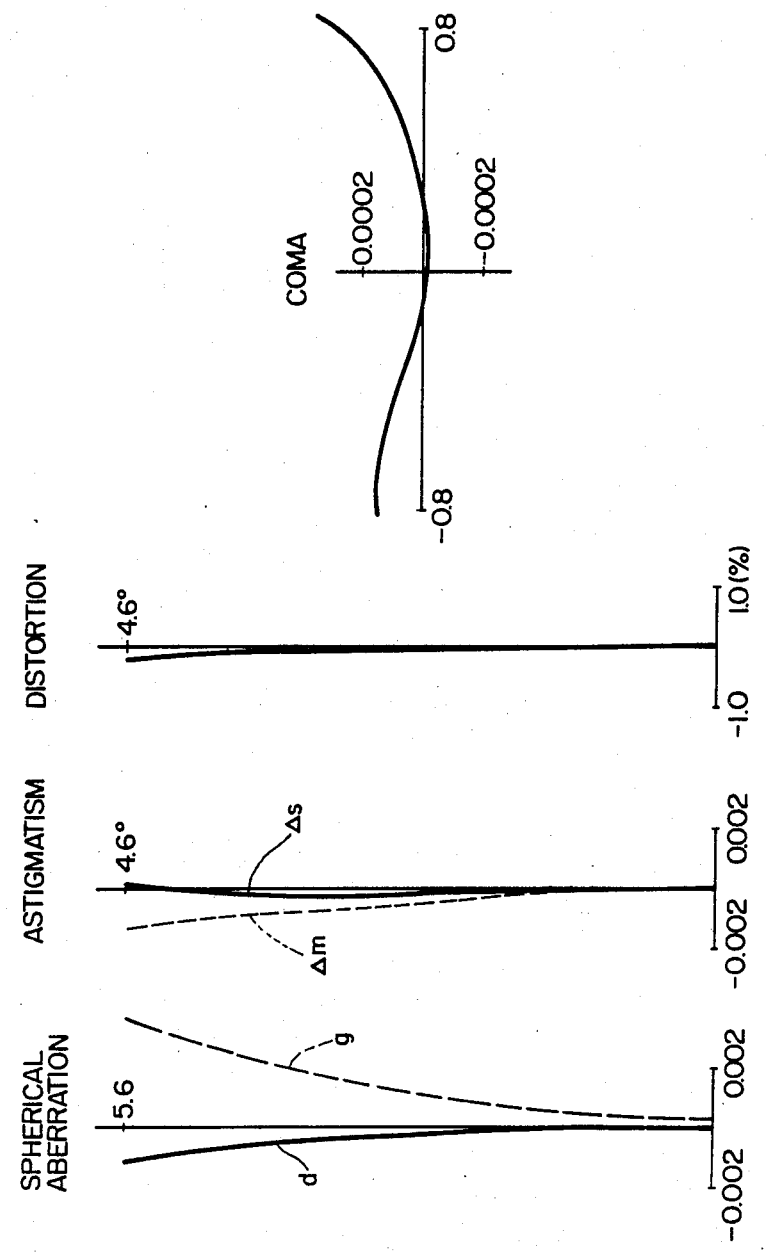

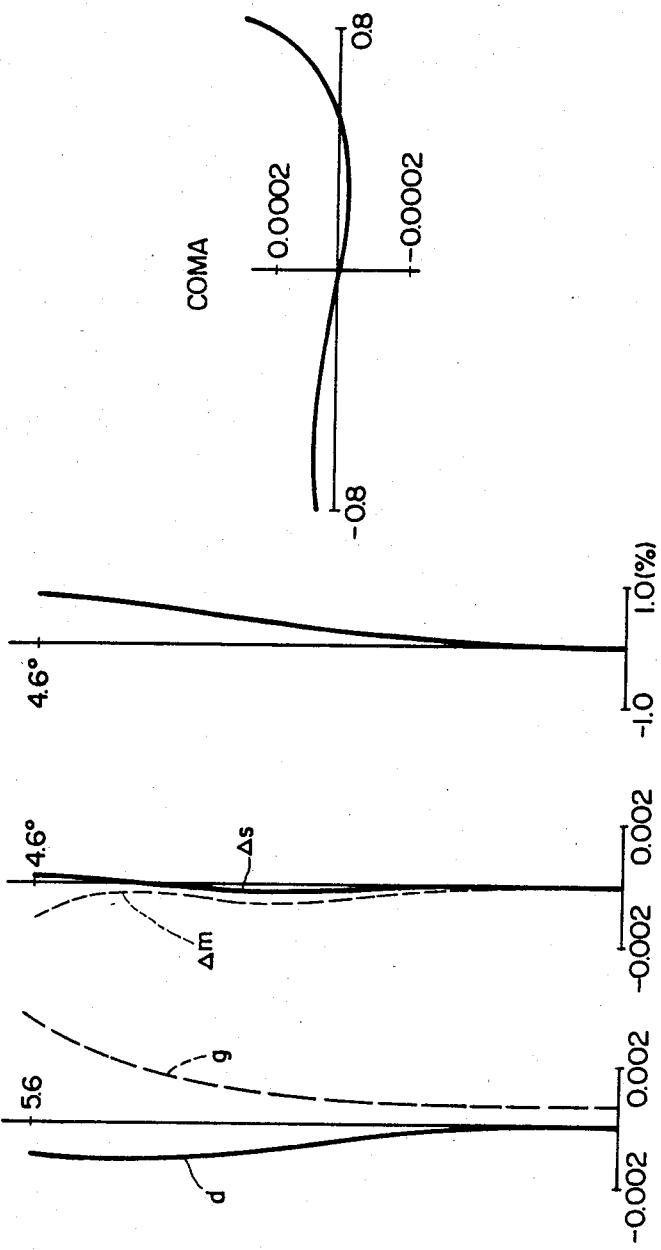

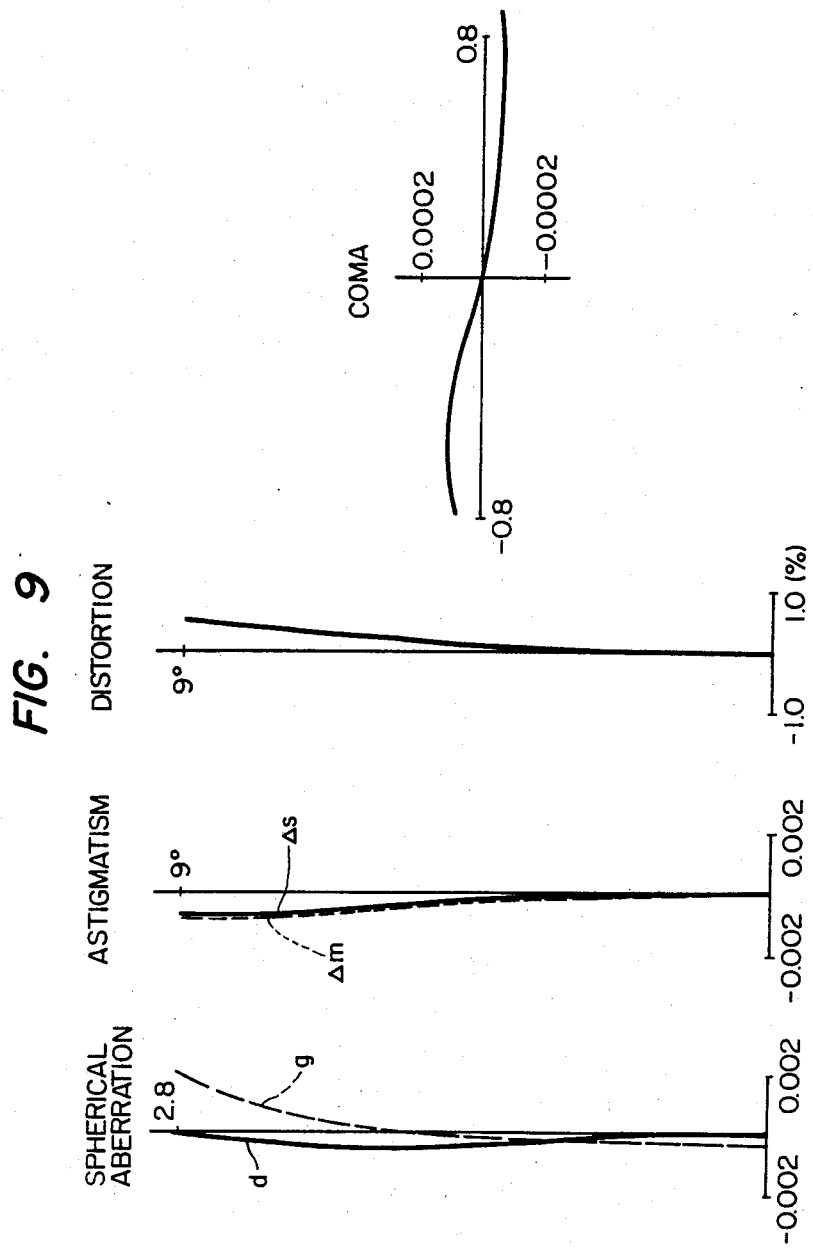

ATTACHMENT LENS SYSTEM

BACKGROUND OF THE INVENTION (a) Field of the Invention

The present invention relates to an attachment lens system which is attached on the image side of a photogramic camera lens system for prolonging its focal length.

(b) Description of the Prior Art

An attachment lens system which is used for prolonging focal length of a master lens system has a negative refractive power as a whole and is placed in most cases close to the imaging position of the master lens system in order to avoid mechanical interference with the master lens system. Therefore, the attachment lens system has a strong negative refractive power and a negative Petzval's sum large in absolute in the entire lens system of the attachment lens system, thereby shifting imaging position largely toward the positive side in the entire lens system including the master lens system as angle of field is increased. Further, the attachment lens system has an effect to aggravate aberrations in the master lens system. Especially when spherical aberration has a large negative value, the optimum imaging position at each field angle is largely shifted along optical axis. Furthermore, since the attachment lens system has a large negative refractive power and aberrations in the attachment lens system itself can hardly be corrected, image quality is apt to be rather degraded as compared with that in the master lens system when the attachment lens is combined with the master lens system. There have conventionally been known attachment lens systems disclosed by Japanese unexamined published patents No. 109930/77 and No. 146621/77 and having compositions similar to that of the attachment lens system according to the present invention described later in this patent specification. The former attachment lens system comprises five components of seven lens elements, but cannot assure favorably corrected astigmatism regardless of the larger number of lens elements and seems to have undercorrected Petzval's sum. The latter attachment lens system comprises four components of six lens elements, seems to be designed for use with a master lens system having a focal length of 300 mm and F2.8, and has aberration more aggravated when it is combined with a tele photo lens system having focal length of 100–200 mm. As is described in the foregoing, the conventional attachment lens systems had defects that Petzval's sum and other aberrations were not corrected sufficiently and quantity of marginal ray is apt to be insufficient.

SUMMARY OF THE INVENTION

A general object of the present invention is to provide an attachment lens system in which various aberrations are favorably corrected and especially curvature of field which can usually be rather hard to correct is also corrected favorably.

The attachment lens system according to the present invention has such a composition as shown in FIG. 1, i.e. it comprises two groups of six lens components: a front lens group consisting of a first negative meniscus lens component having a convex surface on the object side, a second biconvex lens component and a third biconcave lens component, and a rear lens group consisting of a fourth biconvex lens component, a fifth positive meniscus lens component having a concave surface on the object side and a sixth biconcave lens component.

The reason for adopting the above-mentioned composition for the attachment lens system according to the present invention is as described below.

As is already described above, an attachment lens system has a negative refractive power as a whole and can therefore be regarded as a single concave lens element. When this concave lens element is separated into a negative lens element and a positive lens element, the front principal point of the attachment lens system is made farther from the imaging position of the master lens system. This is made for the purpose of correcting Petzval's sum and aberrations by reducing power of the entire attachment lens system. Further, the negative front lens group and the positive rear lens group are split into a positive lens element and a negative lens element respectively so that the entire attachment lens system is composed of positive, negative, positive and negative lens elements. In other words, the lens system shown in FIG. 1 is considered as a system comprising a positive lens component consisting of the first and second lens elements, the third negative lens component, a positive lens component consisting of the fourth and fifth lens elements, and the sixth negative lens component.

This is a measure for correcting Petzval's sum by determining refractive indices of the respective lens elements as defined by the condition (4) described later, and correcting chromatic aberration. Furthermore, the positive lens component in the front lens group is split into a negative lens element and a positive lens element, i.e., the first lens element and the second lens element shown in FIG. 1 so that the front lens group consists of negative, positive and negative lens components. This is a measure to further minimize Petzval's sum and facilitate correction of chromatic aberration which can usually be hardly corrected. In order to correct Petzval's sum, it is required to increase power and reduce refractive index of the positive lens component in the rear lens group,. For this purpose, it is required to select a small radius of curvature on the positive lens component, but such a measure will make it difficult to correct coma, etc. In order to avoid such difficulty, it is effective to split the positive lens component in the rear lens group into two so that the rear lens group consists of positive, positive and negative lens components as shown in FIG. 1.

The attachment lens system according to the present invention is characterized in that it has a composition shown in FIG. 1 for the above-described reason and satisfies the following conditions for accomplishing the afore-mentioned object of the present invention:

(1) $f_F < 0$, $f_R > 0$
(2) $0.25 < |f_{45}/f_0| < 0.32$
(3) $0.16 < (d_7 + d_8 + d_9)/|f_0| < 0.21$
(4) $1.4 < n_2, n_4, n_5 < 1.6$
    $1.7 < n_1, n_3, n_6 < 1.9$
(5) $30 < \nu_2, \nu_4, \nu_5 < 51.5$
    $37 < \nu_1, \nu_3, \nu_6 < 51$ wherein the reference symbols are defined as follows:

$f_F$: focal length of the front lens group $f_R$: focal length of the rear lens group $f_{45}$: total focal length of the fourth and fifth lens component $f_0$: focal length of the entire attachment lens system as a whole $d_7$ and $d_9$: thicknesses of the fourth and fifth lens components respectively $d_8$: airspace reserved between the fourth and fifth lens components $n_1, n_2, n_3, n_4, n_5$ and $n_6$: refractive indices of the respective lens components $\nu_1, \nu_2, \nu_3, \nu_4, \nu_5$ and $\nu_6$: Abbe's numbers of the respective lens components The object of the present invention can be accomplished by selecting the lens composition shown in FIG. 1 and designing the lens system so as to satisfy the aforementioned conditions (1) through (5). However, the lens system should preferably satisfy the following additional conditions (6) through (11) since it can be made more favorable one when designed so as to satisfy the following conditions:

(6) $0.6 < r_2/r_3 < 0.7$
(7) $0.01 < d_2/|f_0| < 0.03$
(8) $0.43 < r_5/r_4 < 1.0$
(9) $0.01 < d_4/|f_0| < 0.04$
(10) $0.20 < |r_{10}|/|f_0| < 0.35$
(11) $\nu_2 < \nu_5$ wherein the reference symbols are defined as follows:

$r_2$: radius of curvature on the image side surface of the first lens component $r_3$ and $r_4$: radii of curvature on both the surfaces of the second lens $r_5$: radius of curvature on the object side surface of the third lens component $r_{10}$: radius of curvature on the image side surface of the fifth lens component Out of the conditions (1) through (5) mentioned above the condition (1), (2) and (3) define the fundamental composition of the attachment lens system according to the present invention.

The conditions (1) and (2) define power distribution in the lens system according to the present invention. The condition (1) is essential for correcting aberrations favorably by locating the front principal point of the attachment lens system apart from the imaging position of the master lens system and reducing negative power. Deviation from the range defined by the condition (1) will make it impossible to locate the front principal point apart from the imaging position of the master lens system, thereby increasing the negative refractive power to give adverse effect on correction of aberration.

The condition (2) defines total power of the two positive lens components in the rear lens group. If the upper limit of the condition (2) is exceeded, Petzval's sum will be degraded and astigmatism will be aggravated. If the lower limit of the condition (2) is exceeded, in contrast, high-order coma flare will easily be produced.

The condition (3) relates to certain formal characteristics of the lens system according to the present invention. In the rear lens group, the positive lens component is split into two elements for favorably correcting both Petzval's sum and flare due to coma as described above. In order to prevent the respective lens elements from being too thin to reserve adequate effective diameters (especially to reserve sufficient quantity of marginal rays), the condition (3) defines thicknesses of the positive lens elements and airspace therebetween. If the lower limit of the condition (3) is exceeded, quantity of the marginal rays will be insufficient. If the upper limit of the condition (3) is exceeded, in contrast, it will be difficult to design the entire lens system compact.

The condition (4) defines refractive indices of glass materials for the respective lens components for the purpose of correcting Petzval's sum more favorable, since it is essential, for correcting Petzval's sum toward positive side to select glass materials having low refractive indices for the lens components having positive refractive powers, and glass materials having high refractive indices for the lens components having negative refractive powers. This will be understood from the fact that Petzval's sum PS is given by the following equation:

$$PS = \sum_{j=1}^{6} (n_j f_j)^{-1}$$

Deviation from the range defined by the condition (4) will be undesirable for correction of Petzval's sum.

The condition (5) defines Abbe's numbers of the respective lens components for correcting longitudinal chromatic aberration and lateral chromatic aberration. When the attachment lens system is attached to the rear of a master lens system, chromatic aberration will be overcorrected in the entire lens system including the master lens system. It is therefore necessary to select glass materials having Abbe's numbers higher than the lower limit defined by the condition (5) for the lens components having negative refractive powers, and glass materials having Abbe's numbers lower than the upper limit for the lens components having positive refractive powers so as to prevent chromatic aberration from being overcorrected. Deviation from the range defined by the condition (5) will make it impossible to favorably correct longitudinal chromatic aberration and lateral chromatic aberration.

As is understood from the foregoing descriptions, an attachment lens system accomplishing the object of the present invention can be obtained by designing it so as to satisfy the conditions (1) through (5). However, the lens system can be made more favorable when it is designed so as to further satisfy the afore-mentioned additional conditions (6) through (11).

The conditions (6) and (7) define radius of curvature and thickness of the first air lens formed between the first and second lens components. If the upper limit of the condition (6) is exceeded, astigmatism will be produced easily, and flare due to coma and spherical aberration will be undercorrected. If the lower limit of the condition (6) is exceeded, in contrast, lateral chromatic aberration is easily produced and mechanical interference will be easily caused between image side surface of the first lens component and the object side surface of the second lens component.

The conditions (8) and (9) have been adopted for the same purpose as that of the conditions (6) and (7), and define radius of curvature and thickness of the second air lens. If the upper limit of the condition (8) is exceeded, astigmatism as well as flare due to coma and spherical aberration will easily be produced. If the lower limit of the condition (8) is exceeded, in contrast, lateral chromatic aberration will easily be produced and, in addition, mechanical interference will easily be caused between the image side surface of the second lens component and the object side surface of the third lens component. If the upper limit of the condition (9) is exceeded, lateral chromatic aberration will easily be produced. If the lower limit of the condition (9) is exceeded, in contrast, mechanical interference will easily be caused between the image side surface of the second lens component and the object side surface of the third lens component.

The condition (10) defines radius of curvature on the image side surface of the fifth lens component. If the upper limit of this condition is exceeded, astigmatism will easily be produced. If the lower limit of the condition (10) is exceeded, in contrast, lateral chromatic aberration will easily be produced.

The condition (11) clarifies that chromatic aberrations can be corrected by selecting a small Abbe's number $\nu_2$ for the second lens component in the front lens group having relatively large influence on longitudinal chromatic aberration so as to correct longitudinal chromatic aberration, and selecting a large Abbe's number $\nu_5$ for the fifth lens component in the rear lens group having relatively low influence on longitudinal chromatic aberration within a range not exceeding the upper limit of the condition (9) so as to correct lateral chromatic aberration which is remarkably undercorrected by selecting the small Abbe's number $\nu_2$. Therefore, chromatic aberrations will be aggravated if these conditions are not satisfied. Further, selection of relationship $\nu_1 < \nu_6$ will be more favorable for correcting chromatic aberrations.

Moreover, the correcting effect of the condition (6) will be made more remarkable by selecting relationship $|r_2/f_0| > 0.16$ in addition to satisfaction of the condition (6), and the correcting effect of the condition (8) can be made more remarkable by selecting relationship $|r_5/f_0| > 0.2$ in addition to satisfaction of the condition (8).

BRIEF DESCRIPTION OF THE DRAWINGS

FIG. 2 through FIG. 7 show curves illustrating the aberration characteristics of embodiments 1 through 6 of the present invention;

FIG. 9 shows curves illustrating the aberration characteristics of the master lens system.

DETAILED DESCRIPTION OF THE PREFERRED EMBODIMENTS

Figure 1:
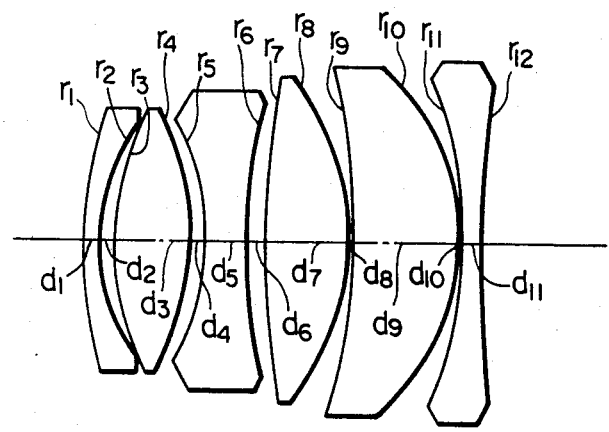
FIG. 1 shows a sectional view illustrating the composition of the attachment lens system according to the present invention.

Now, numerical data for the attachment lens system will be mentioned as preferred embodiments of the present invention:

Embodiment 1:

$d_0 = 5.975 \times 10^{-2}$
$r_1 = 0.15924$
$d_1 = 4.478 \times 10^{-3}$  $n_1 = 1.81554$  $\nu_1 = 44.45$
$r_2 = 0.06117$
$d_2 = 6.478 \times 10^{-3}$
$r_3 = 0.08968$
$d_3 = 2.275 \times 10^{-2}$  $n_2 = 1.59270$  $\nu_2 = 35.29$
$r_4 = -0.14363$
$d_4 = 1.003 \times 10^{-2}$
$r_5 = -0.10895$
$d_5 = 1.340 \times 10^{-2}$  $n_3 = 1.80400$  $\nu_3 = 46.57$
$r_6 = 0.16973$
$d_6 = 4.552 \times 10^{-3}$
$r_7 = 0.23313$ -continued Embodiment 1:

$d_7 = 2.450 \times 10^{-2}$  $n_4 = 1.51118$  $\nu_4 = 51.02$
$r_8 = -0.09051$
$d_8 = 8.190 \times 10^{-4}$
$r_9 = -0.39036$
$d_9 = 2.230 \times 10^{-2}$  $n_5 = 1.51118$  $\nu_5 = 51.02$
$r_{10} = -0.07549$
$d_{10} = 5.597 \times 10^{-4}$
$r_{11} = -0.14456$
$d_{11} = 6.716 \times 10^{-3}$  $n_6 = 1.83481$  $\nu_6 = 42.72$
$r_{12} = 0.33095$
$f = 1$  $F = 5.6$  $\omega = 9.2°$
$f_F = -0.1066$  $f_R = 0.1869$
$f_{45} = 0.0839$  $f_0 = -0.2799$
$|f_{45}/f_0| = 0.3$  $r_2/r_3 = 0.682$
$d_2/|f_0| = 0.0231$  $r_5/r_4 = 0.759$
$d_4/|f_0| = 0.0358$
$|r_{10}|/|f_0| = 0.2697$
$(d_7 + d_8 + d_9)/|f_0| = 0.196$ Embodiment 2:

$d_0 = 5.975 \times 10^{-2}$
$r_1 = 0.15347$
$d_1 = 4.478 \times 10^{-3}$  $n_1 = 1.78590$  $\nu_1 = 44.18$
$r_2 = 0.06081$
$d_2 = 8.254 \times 10^{-3}$
$r_3 = 0.09052$
$d_3 = 2.015 \times 10^{-2}$  $n_2 = 1.59270$  $\nu_2 = 35.29$
$r_4 = -0.08796$
$d_4 = 4.951 \times 10^{-3}$
$r_5 = -0.07648$
$d_5 = 1.329 \times 10^{-2}$  $n_3 = 1.80400$  $\nu_3 = 46.57$
$r_6 = 0.19840$
$d_6 = 4.164 \times 10^{-3}$
$r_7 = 0.39852$
$d_7 = 2.475 \times 10^{-2}$  $n_4 = 1.51118$  $\nu_4 = 51.02$
$r_8 = -0.08695$
$d_8 = 1.109 \times 10^{-3}$
$r_9 = -0.22531$
$d_9 = 2.727 \times 10^{-2}$  $n_5 = 1.51118$  $\nu_5 = 51.02$
$r_{10} = -0.07477$
$d_{10} = 5.597 \times 10^{-4}$
$r_{11} = -0.16478$
$d_{11} = 6.716 \times 10^{-3}$  $n_6 = 1.83400$  $\nu_6 = 37.19$
$r_{12} = 0.40660$
$f = 1$  $F = 5.6$  $\omega = 9.2°$
$f_F = -0.1146$  $f_R = 0.2057$
$f_{45} = 0.0949$  $f_0 = -0.3063$
$|f_{45}/f_0| = 0.31$  $r_2/r_3 = 0.672$
$d_2/|f_0| = 0.0269$  $r_5/r_4 = 0.869$
$d_4/|f_0| = 0.0162$
$|r_{10}|/|f_0| = 0.244$
$(d_7 + d_8 + d_9)/|f_0| = 0.206$ Embodiment 3:

$d_0 = 6.087 \times 10^{-2}$
$r_1 = 0.12893$
$d_1 = 4.478 \times 10^{-3}$  $n_1 = 1.78590$  $\nu_1 = 44.18$
$r_2 = 0.05560$
$d_2 = 5.015 \times 10^{-3}$
$r_3 = 0.08338$
$d_3 = 2.421 \times 10^{-2}$  $n_2 = 1.59270$  $\nu_2 = 35.29$
$r_4 = -0.07450$
$d_4 = 3.272 \times 10^{-3}$
$r_5 = -0.06737$
$d_5 = 1.084 \times 10^{-2}$  $n_3 = 1.80610$  $\nu_3 = 40.95$
$r_6 = 0.15903$
$d_6 = 6.709 \times 10^{-3}$
$r_7 = 0.29913$
$d_7 = 2.247 \times 10^{-2}$  $n_4 = 1.53256$  $\nu_4 = 45.91$
$r_8 = -0.07482$
$d_8 = 1.177 \times 10^{-3}$
$r_9 = -0.14753$
$d_9 = 2.360 \times 10^{-2}$  $n_5 = 1.51118$  $\nu_5 = 51.02$
$r_{10} = -0.06668$ -continued

Embodiment 3:

$d_{10} = 5.597 \times 10^{-4}$ $r_{11} = -0.12460$ $d_{11} = 6.716 \times 10^{-3}$  $n_6 = 1.80610$  $\nu_6 = 40.95$ $r_{12} = 0.59664$ $f = 1$  $F = 5.6$  $\omega = 9.2°$
$f_F = -0.1039$  $f_R = 0.1768$
$f_{45} = 0.0855$  $f_0 = -0.2960$
$|f_{45}/f_0| = 0.289$  $r_2/r_3 = 0.667$
$d_2/|f_0| = 0.0169$  $r_5/r_4 = 0.904$
$d_4/|f_0| = 0.0111$
$|r_{10}|/|f_0| = 0.225$
$(d_7 + d_8 + d_9)/|f_0| = 0.195$

Embodiment 4:

$d_0 = 6.087 \times 10^{-2}$ $r_1 = 0.13319$ $d_1 = 4.478 \times 10^{-3}$  $n_1 = 1.78590$  $\nu_1 = 44.18$ $r_2 = 0.05684$ $d_2 = 4.862 \times 10^{-3}$ $r_3 = 0.08692$ $d_3 = 2.424 \times 10^{-2}$  $n_2 = 1.59270$  $\nu_2 = 35.29$ $r_4 = -0.07853$ $d_4 = 4.825 \times 10^{-3}$ $r_5 = -0.06866$ $d_5 = 1.278 \times 10^{-2}$  $n_3 = 1.80610$  $\nu_3 = 40.95$ $r_6 = 0.16780$ $d_6 = 6.627 \times 10^{-3}$ $r_7 = 0.30490$ $d_7 = 2.631 \times 10^{-2}$  $n_4 = 1.53256$  $\nu_4 = 45.91$ $r_8 = -0.07791$ $d_8 = 1.780 \times 10^{-3}$ $r_9 = -0.20344$ $d_9 = 3.356 \times 10^{-2}$  $n_5 = 1.51118$  $\nu_5 = 51.02$ $r_{10} = -0.07166$ $d_{10} = 5.597 \times 10^{-4}$ $r_{11} = -0.13480$ $d_{11} = 6.716 \times 10^{-3}$  $n_6 = 1.80610$  $\nu_6 = 40.95$ $r_{12} = 0.45225$ $f = 1$  $F = 5.6$  $\omega = 9.2°$
$f_F = -0.1037$  $f_R = 0.1799$
$f_{45} = 0.0844$  $f_0 = -0.3131$
$|f_{45}/f_0| = 0.27$  $r_2/r_3 = 0.654$
$d_2/|f_0| = 0.0155$  $r_5/r_4 = 0.874$
$d_4/|f_0| = 0.0154$
$|r_{10}|/|f_0| = 0.229$
$(d_7 + d_8 + d_9)/|f_0| = 0.197$

Embodiment 5:

$d_0 = 6.087 \times 10^{-2}$ $r_1 = 0.12101$ $d_1 = 4.478 \times 10^{-3}$  $n_1 = 1.72000$  $\nu_1 = 43.7$ $r_2 = 0.05452$ $d_2 = 4.862 \times 10^{-3}$ $r_3 = 0.08939$ $d_3 = 2.424 \times 10^{-2}$  $n_2 = 1.59270$  $\nu_2 = 35.29$ $r_4 = -0.07831$ $d_4 = 4.825 \times 10^{-3}$ $r_5 = -0.06886$ $d_5 = 1.278 \times 10^{-2}$  $n_3 = 1.83481$  $\nu_3 = 42.72$ $r_6 = 0.16237$ $d_6 = 6.627 \times 10^{-3}$ $r_7 = 0.30199$ $d_7 = 2.631 \times 10^{-2}$  $n_4 = 1.51118$  $\nu_4 = 51.02$ $r_8 = -0.07500$ $d_8 = 1.780 \times 10^{-3}$ $r_9 = -0.20557$ $d_9 = 3.356 \times 10^{-2}$  $n_5 = 1.51118$  $\nu_5 = 51.02$ $r_{10} = -0.06975$ $d_{10} = 5.597 \times 10^{-4}$ $r_{11} = -0.13228$ $d_{11} = 6.716 \times 10^{-3}$  $n_6 = 1.78590$  $\nu_6 = 44.18$ $r_{12} = 0.43332$ $f = 1$  $F = 5.6$  $\omega = 9.2°$
$f_F = -0.1025$  $f_R = 0.1760$ -continued

Embodiment 5:

$f_{45} = 0.0835$  $f_0 = -0.3167$
$|f_{45}/f_0| = 0.264$  $r_2/r_3 = 0.610$
$d_2/|f_0| = 0.0154$  $r_5/r_4 = 0.879$
$d_4/|f_0| = 0.0152$
$|r_{10}|/|f_0| = 0.220$
$(d_7 + d_8 + d_9)/|f_0| = 0.195$

Embodiment 6:

$d_0 = 6.087 \times 10^{-2}$ $r_1 = 0.20582$ $d_1 = 4.478 \times 10^{-3}$  $n_1 = 1.81554$  $\nu_1 = 44.45$ $r_2 = 0.07178$ $d_2 = 6.478 \times 10^{-3}$ $r_3 = 0.10620$ $d_3 = 2.275 \times 10^{-2}$  $n_2 = 1.59270$  $\nu_2 = 35.29$ $r_4 = -0.4$ $d_4 = 1.003 \times 10^{-2}$ $r_5 = -0.17977$ $d_5 = 1.340 \times 10^{-2}$  $n_3 = 1.80400$  $\nu_3 = 46.57$ $r_6 = 0.99009$ $d_6 = 4.552 \times 10^{-3}$ $r_7 = 0.19010$ $d_7 = 2.450 \times 10^{-2}$  $n_4 = 1.51118$  $\nu_4 = 51.02$ $r_8 = -0.10731$ $d_8 = 8.190 \times 10^{-4}$ $r_9 = -0.41926$ $d_9 = 2.230 \times 10^{-2}$  $n_5 = 1.51118$  $\nu_5 = 51.02$ $r_{10} = -0.10554$ $d_{10} = 5.597 \times 10^{-4}$ $r_{11} = -0.15470$ $d_{11} = 6.716 \times 10^{-3}$  $n_6 = 1.83481$  $\nu_6 = 42.72$ $r_{12} = 0.22178$ $f = 1$  $F = 5.6$  $\omega = 9.2°$
$f_F = -0.1802$  $f_R = 0.3570$
$f_{45} = 0.0994$  $f_0 = -0.3173$
$|f_{45}/f_0| = 0.313$  $r_2/r_3 = 0.676$
$d_2/|f_0| = 0.0204$  $r_5/r_4 = 0.449$
$d_4/|f_0| = 0.0316$
$|r_{10}|/|f_0| = 0.333$
$(d_7 + d_8 + d_9)/|f_0| = 0.173$ wherein the reference symbols $r_1$ through $r_{12}$ represent radii of curvature on the surfaces of the respective lens elements, the reference symbol $d_0$ designates the airspace reserved between the master lens system and the attachment lens system, the reference symbols $d_1$ through $d_{11}$ denote thicknesses of the respective lens components and airspaces reserved therebetween, the reference symbols $n_1$ through $n_6$ represent refractive indices of the respective lens components, the reference symbols $\nu_1$ through $\nu_6$ designate Abbe's numbers of the respective lens components and the reference symbol $f$ denotes focal length of the entire lens system including the master lens system.

Figure 8:
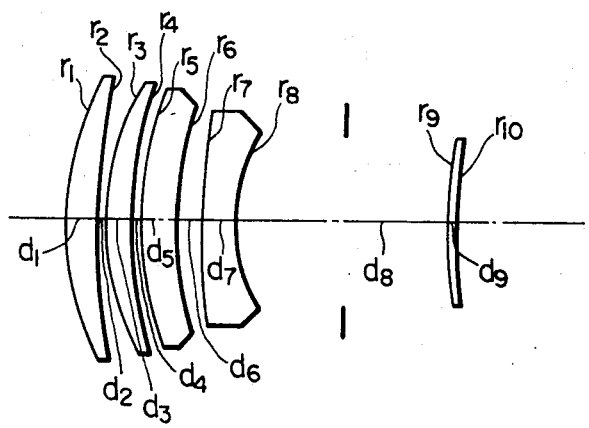
FIG. 8 shows a sectional view illustrating composition of the master lens system for use with the attachment lens system according to the present invention.

Now, numerical data will be mentioned for an example of master lens system to be used in combination with the attachment lens system according to the present invention and having the composition shown in FIG. 8:

$r_1 = 0.38449$ $d_1 = 3.916 \times 10^{-2}$  $n_1 = 1.64000$  $\nu_1 = 60.09$ $r_2 = 1.49949$ $d_2 = 7.459 \times 10^{-4}$ $r_3 = 0.34630$ $d_3 = 3.170 \times 10^{-2}$  $n_2 = 1.61375$  $\nu_2 = 56.36$ $r_4 = 0.59655$ $d_4 = 2.461 \times 10^{-3}$ $r_5 = 0.37459$ $d_5 = 6.377 \times 10^{-2}$  $n_3 = 1.70154$  $\nu_3 = 41.1$ $r_6 = 0.46176$ -continued $r_7 = 0.96796$
$r_8 = 0.19559$
$r_9 = 0.64310$
$r_{10} = 1.86616$
$f_M = 1$ $d_6 = 2.596 \times 10^{-2}$
$d_7 = 4.087 \times 10^{-2}$  $n_4 = 1.78470$  $\nu_4 = 26.22$
$d_8 = 2.756 \times 10^{-1}$
$d_9 = 1.499 \times 10^{-2}$  $n_5 = 1.80518$  $\nu_5 = 25.43$
$F = 2.8$  $\omega = 18.4°$ FIG. 2 through FIG. 7 illustrate aberration characteristics of the first through seventh embodiments of the present invention. Since the attachment lens system according to the present invention does not form an image by itself, the aberration characteristics are illustrated as those in the entire lens system including both the attachment lens system and the master lens system. The aberration characteristics of the master lens system itself are illustrated independently in FIG. 9.

I claim:

1. An attachment lens system comprising a front lens group consisting of a first negative meniscus lens component having a convex surface on the object side, a second biconvex lens component and a third biconcave lens component, and a rear lens group consisting of a fourth biconvex lens component, a fifth positive meniscus lens component having a concave surface on the object side and a sixth biconcave lens component, said lens system being so designed as to satisfy the following conditions:

(1) $f_F < 0$, $f_R > 0$
(2) $0.25 < |f_{45}/f_0| < 0.32$
(3) $0.16 < (d_7 + d_8 + d_9)/|f_0| < 0.21$
(4) $1.4 < n_2, n_4, n_5 < 1.6$
    $1.7 < n_1, n_3, n_6 < 1.9$
(5) $30 < \nu_2, \nu_4, \nu_5 < 51.5$
    $37 < \nu_1, \nu_3, \nu_6 < 51$ wherein the reference symbol $f_F$ represent focal length of said front lens group, the reference symbol $f_R$ designates focal length of said rear lens group, the reference symbol $f_{45}$ denotes total focal length of said fourth and fifth lens components, the reference symbol $f_0$ represents focal length of the entire attachment lens system as a whole, the reference symbols $d_7$ and $d_9$ designate thicknesses of said fourth and fifth lens components respectively, the reference symbol $d_8$ denotes airspace reserved between said fourth and fifth lens components, the reference symbols $n_1$ through $n_6$ represent refractive indices of the respective lens components and the reference symbols $\nu_1$ through $\nu_6$ designate Abbe's numbers of the respective lens components.

2. An attachment lens system according to claim 1 satisfying the following additional conditions (6) through (11):

(6) $0.6 < r_2/r_3 < 0.7$
(7) $0.01 < d_2/|f_0| < 0.03$
(8) $0.43 < r_5/r_4 < 1.0$
(9) $0.01 < d_4/|f_0| < 0.04$
(10) $0.20 < |r_{10}|/|f_0 < 0.35$
(11) $\nu_2 < \nu_5$ wherein the reference symbols $r_2$, $r_3$, $r_4$, $r_5$ and $r_{10}$ represent radii of curvature on the image side surface of said first lens component, both the surfaces of said second lens component, the object side surface of said third lens component and the image side surface of said fifth lens component, the reference symbol $d_2$ designates the airspace reserved between said first and second lens components, and the reference symbol $d_4$ denotes the airspace reserved between said second and third lens components.

3. An attachment lens system according to claim 1 having the following numerical data:

$r_1 = 0.15924$  $d_0 = 5.975 \times 10^{-2}$
$r_2 = 0.06117$  $d_1 = 4.478 \times 10^{-3}$  $n_1 = 1.81554$  $\nu_1 = 44.45$
$r_3 = 0.08968$  $d_2 = 6.478 \times 10^{-3}$
$r_4 = -0.14363$  $d_3 = 2.275 \times 10^{-2}$  $n_2 = 1.59270$  $\nu_2 = 35.29$
$r_5 = -0.10895$  $d_4 = 1.003 \times 10^{-2}$
$r_6 = 0.16973$  $d_5 = 1.340 \times 10^{-2}$  $n_3 = 1.80400$  $\nu_3 = 46.57$
$r_7 = 0.23313$  $d_6 = 4.552 \times 10^{-3}$
$r_8 = -0.09051$  $d_7 = 2.450 \times 10^{-2}$  $n_4 = 1.51118$  $\nu_4 = 51.02$
$r_9 = -0.39036$  $d_8 = 8.190 \times 10^{-4}$
$r_{10} = -0.07549$  $d_9 = 2.230 \times 10^{-2}$  $n_5 = 1.51118$  $\nu_5 = 51.02$
$r_{11} = -0.14456$  $d_{10} = 5.597 \times 10^{-4}$
$r_{12} = 0.33095$  $d_{11} = 6.716 \times 10^{-3}$  $n_6 = 1.83481$  $\nu_6 = 42.72$
$f = 1$  $F = 5.6$  $\omega = 9.2°$
$f_F = -0.1066$  $f_R = 0.1869$
$f_{45} = 0.0839$  $f_0 = -0.2799$
$|f_{45}/f_0| = 0.3$  $r_2/r_3 = 0.682$
$d_2/|f_0| = 0.0231$  $r_5/r_4 = 0.759$
$d_4/|f_0| = 0.0358$
$|r_{10}|/|f_0| = 0.2697$
$(d_7 + d_8 + d_9)/|f_0| = 0.196$ wherein the reference symbols $r_1$ through $r_{12}$ represent radii of curvature on the surfaces of the respective lens elements, the reference symbols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

4. An attachment lens system according to claim 1 having the following numerical data:

$r_1 = 0.15347$  $d_0 = 5.975 \times 10^{-2}$
$r_2 = 0.06081$  $d_1 = 4.478 \times 10^{-3}$  $n_1 = 1.78590$  $\nu_1 = 44.18$
$r_3 = 0.09052$  $d_2 = 8.254 \times 10^{-3}$
$r_4 = -0.08796$  $d_3 = 2.015 \times 10^{-2}$  $n_2 = 1.59270$  $\nu_2 = 35.29$
$r_5 = -0.07648$  $d_4 = 4.951 \times 10^{-3}$
$r_6 = 0.19840$  $d_5 = 1.329 \times 10^{-2}$  $n_3 = 1.80400$  $\nu_3 = 46.57$
$r_7 = 0.39852$  $d_6 = 4.164 \times 10^{-3}$
$r_8 = -0.08695$  $d_7 = 2.475 \times 10^{-2}$  $n_4 = 1.51118$  $\nu_4 = 51.02$
$r_9 = -0.22531$  $d_8 = 1.109 \times 10^{-3}$
$r_{10} = -0.07477$  $d_9 = 2.727 \times 10^{-2}$  $n_5 = 1.51118$  $\nu_5 = 51.02$
$r_{11} = -0.16478$  $d_{10} = 5.597 \times 10^{-4}$
$r_{12} = 0.40660$  $d_{11} = 6.716 \times 10^{-3}$  $n_6 = 1.83400$  $\nu_6 = 37.19$
$f = 1$  $F = 5.6$  $\omega = 9.2°$
$f_F = -0.1146$  $f_R = 0.2057$
$f_{45} = 0.0949$  $f_0 = -0.3063$ -continued

| | |
|---|---|
| $\|f_{45}/f_0\| = 0.31$ | $r_2/r_3 = 0.672$ |
| $d_2/\|f_0\| = 0.0269$ | $r_5/r_4 = 0.869$ |
| $d_4/\|f_0\| = 0.0162$ | |
| $\|r_{10}\|/\|f_0\| = 0.244$ | |
| $(d_7 + d_8 + d_9)/\|f_0\| = 0.206$ | | wherein the reference symbols $r_1$ through $r_{12}$ represent radii of curvature on the surfaces of the respective lens elements, the reference symbols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

5. An attachment lens system according to claim 1 having the following numerical data:

$d_0 = 6.087 \times 10^{-2}$
$r_1 = 0.12893$
$d_1 = 4.478 \times 10^{-3}$   $n_1 = 1.78590$   $\nu_1 = 44.18$
$r_2 = 0.05560$
$d_2 = 5.015 \times 10^{-3}$
$r_3 = 0.08338$
$d_3 = 2.421 \times 10^{-2}$   $n_2 = 1.59270$   $\nu_2 = 35.29$
$r_4 = -0.07450$
$d_4 = 3.272 \times 10^{-3}$
$r_5 = -0.06737$
$d_5 = 1.084 \times 10^{-2}$   $n_3 = 1.80610$   $\nu_3 = 40.95$
$r_6 = 0.15903$
$d_6 = 6.709 \times 10^{-3}$
$r_7 = 0.29913$
$d_7 = 2.247 \times 10^{-2}$   $n_4 = 1.53256$   $\nu_4 = 45.91$
$r_8 = -0.07482$
$d_8 = 1.177 \times 10^{-3}$
$r_9 = -0.14753$
$d_9 = 2.360 \times 10^{-2}$   $n_5 = 1.51118$   $\nu_5 = 51.02$
$r_{10} = -0.06668$
$d_{10} = 5.597 \times 10^{-4}$
$r_{11} = -0.12460$
$d_{11} = 6.716 \times 10^{-3}$   $n_6 = 1.80610$   $\nu_6 = 40.95$
$r_{12} = 0.59664$
$f = 1$    $F = 5.6$    $\omega = 9.2°$
$f_F = -0.1039$    $f_R = 0.1768$
$f_{45} = 0.0855$    $f_0 = -0.2960$
$\|f_{45}/f_0\| = 0.289$    $r_2/r_3 = 0.667$
$d_2/\|f_0\| = 0.0169$    $r_5/r_4 = 0.904$
$d_4/\|f_0\| = 0.0111$
$\|r_{10}\|/\|f_0\| = 0.225$
$(d_7 + d_8 + d_9)/\|f_0\| = 0.195$ wherein the reference symbols $r_1$ through $r_{12}$ represent radii of curvature on the surfaces of the respective lens elements, the reference symbols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

6. An attachment lens system according to claim 1 having the following numerical data:

$d_0 = 6.087 \times 10^{-2}$
$r_1 = 0.13319$
$d_1 = 4.478 \times 10^{-3}$   $n_1 = 1.78590$   $\nu_1 = 44.18$
$r_2 = 0.05684$
$d_2 = 4.862 \times 10^{-3}$
$r_3 = 0.08692$
$d_3 = 2.424 \times 10^{-2}$   $n_2 = 1.59270$   $\nu_2 = 35.29$
$r_4 = -0.07853$
$d_4 = 4.825 \times 10^{-3}$
$r_5 = -0.06866$
$d_5 = 1.278 \times 10^{-2}$   $n_3 = 1.80610$   $\nu_3 = 40.95$
$r_6 = 0.16780$
$d_6 = 6.627 \times 10^{-3}$
$r_7 = 0.30490$
$d_7 = 2.631 \times 10^{-2}$   $n_4 = 1.53256$   $\nu_4 = 45.91$
$r_8 = -0.07791$
$d_8 = 1.780 \times 10^{-3}$
$r_9 = -0.20344$
$d_9 = 3.356 \times 10^{-2}$   $n_5 = 1.51118$   $\nu_5 = 51.02$
$r_{10} = -0.07166$
$d_{10} = 5.597 \times 10^{-4}$
$r_{11} = -0.13480$
$d_{11} = 6.716 \times 10^{-3}$   $n_6 = 1.80610$   $\nu_6 = 40.95$
$r_{12} = 0.45225$
$f = 1$    $F = 5.6$    $\omega = 9.2°$
$f_F = -0.1037$    $f_R = 0.1799$
$f_{45} = 0.0844$    $f_0 = -0.3131$
$\|f_{45}/f_0\| = 0.27$    $r_2/r_3 = 0.654$
$d_2/\|f_0\| = 0.0155$    $r_5/r_4 = 0.874$
$d_4/\|f_0\| = 0.0154$
$\|r_{10}\|/\|f_0\| = 0.299$
$(d_7 + d_8 + d_9)/\|f_0\| = 0.197$ wherein the reference symbols $r_1$ through $r_{12}$ represent radii of curvature on the surfaces of the respective lens elements, the reference symbols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

7. An attachment lens system according to claim 1 having the following numerical data:

$d_0 = 6.087 \times 10^{-2}$
$r_1 = 0.12101$
$d_1 = 4.478 \times 10^{-3}$   $n_1 = 1.72000$   $\nu_1 = 43.7$
$r_2 = 0.05452$
$d_2 = 4.862 \times 10^{-3}$
$r_3 = 0.08939$
$d_3 = 2.424 \times 10^{-2}$   $n_2 = 1.59270$   $\nu_2 = 35.29$
$r_4 = -0.07831$
$d_4 = 4.825 \times 10^{-3}$
$r_5 = -0.06886$
$d_5 = 1.278 \times 10^{-2}$   $n_3 = 1.83481$   $\nu_3 = 42.72$
$r_6 = 0.16237$
$d_6 = 6.627 \times 10^{-3}$
$r_7 = 0.30199$
$d_7 = 2.631 \times 10^{-2}$   $n_4 = 1.51118$   $\nu_4 = 51.02$
$r_8 = -0.07500$
$d_8 = 1.780 \times 10^{-3}$
$r_9 = -0.20557$
$d_9 = 3.356 \times 10^{-2}$   $n_5 = 1.51118$   $\nu_5 = 51.02$
$r_{10} = -0.06975$
$d_{10} = 5.597 \times 10^{-4}$
$r_{11} = -0.13228$
$d_{11} = 6.716 \times 10^{-3}$   $n_6 = 1.78590$   $\nu_6 = 44.18$
$r_{12} = 0.43332$
$f = 1$    $F = 5.6$    $\omega = 9.2°$
$f_F = -0.1025$    $f_R = 0.1760$
$f_{45} = 0.0835$    $f_0 = -0.3167$
$\|f_{45}/f_0\| = 0.264$    $r_2/r_3 = 0.610$
$d_2/\|f_0\| = 0.0154$    $r_5/r_4 = 0.879$
$d_4/\|f_0\| = 0.0152$
$\|r_{10}\|/\|f_0\| = 0.220$
$(d_7 + d_8 + d_9)/\|f_0\| = 0.195$ wherein the reference symbols $r_1$ through $r_{12}$ represent radii of curvature on the surfaces of the respective lens elements, the reference sybmols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

8. An attachment lens system according to claim 1 having the following numerical data:

$d_0 = 6.087 \times 10^{-2}$
$r_1 = 0.20582$
$\quad d_1 = 4.478 \times 10^{-3} \quad n_1 = 1.81554 \quad \nu_1 = 44.45$
$r_2 = 0.07178$
$\quad d_2 = 6.478 \times 10^{-3}$
$r_3 = 0.10620$
$\quad d_3 = 2.275 \times 10^{-2} \quad n_2 = 1.59270 \quad \nu_2 = 35.29$
$r_4 = -0.4$
$\quad d_4 = 1.003 \times 10^{-2}$
$r_5 = -0.17977$
$\quad d_5 = 1.340 \times 10^{-2} \quad n_3 = 1.80400 \quad \nu_3 = 46.57$
$r_6 = 0.99009$
$\quad d_6 = 4.552 \times 10^{-3}$
$r_7 = 0.19010$
$\quad d_7 = 2.450 \times 10^{-2} \quad n_4 = 1.51118 \quad \nu_4 = 51.02$
$r_8 = -0.10731$
$\quad d_8 = 8.190 \times 10^{-4}$
$r_9 = -0.41926$
$\quad d_9 = 2.230 \times 10^{-2} \quad n_5 = 1.51118 \quad \nu_5 = 51.02$ -continued $r_{10} = -0.10554$
$\quad d_{10} = 5.597 \times 10^{-4}$
$r_{11} = -0.15470$
$\quad d_{11} = 6.716 \times 10^{-3} \quad n_6 = 1.83481 \quad \nu_6 = 42.72$
$r_{12} = 0.22178$
$\quad f = 1 \quad\quad F = 5.6 \quad\quad \omega = 9.2°$
$\quad f_F = -0.1802 \quad\quad f_R = 0.3570$
$\quad f_{45} = 0.0994 \quad\quad f_0 = -0.3173$
$\quad |f_{45}/f_0| = 0.313 \quad\quad r_2/r_3 = 0.676$
$\quad d_2/|f_0| = 0.0204 \quad\quad r_5/r_4 = 0.449$
$\quad d_4/|f_0| = 0.0316$
$\quad |r_{10}|/|f_0| = 0.333$
$\quad (d_7 + d_8 + d_9)/|f_0| = 0.173$ wherein the reference symbols $r_1$ through $r_{12}$ represent radii of curvature on the surfaces of the respective lens elements, the reference symbols $d_0$ through $d_{11}$ designate thicknesses of the respective lens elements and the airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

* * * * *